US012122424B2

(12) United States Patent
Han et al.

(10) Patent No.: US 12,122,424 B2
(45) Date of Patent: Oct. 22, 2024

(54) WIND GUST DETECTION BY AN AUTONOMOUS VEHICLE

(71) Applicant: TUSIMPLE, INC., San Diego, CA (US)

(72) Inventors: Xiaoling Han, San Diego, CA (US); Zehua Huang, San Diego, CA (US); Arda Kurt, San Diego, CA (US); Yishi Liu, Tucson, AZ (US); Zhiqi Gong, Tucson, AZ (US); Yue Pan, Tucson, AZ (US); Todd B. Skinner, San Diego, CA (US); Yujia Wu, San Diego, CA (US); Jianqiu Cao, Tucson, AZ (US); Zijie Xuan, San Diego, CA (US); Shuhan Yang, Tucson, AZ (US)

(73) Assignee: TUSIMPLE, INC., San Diego, CA (US)

( * ) Notice: Subject to any disclaimer, the term of this patent is extended or adjusted under 35 U.S.C. 154(b) by 101 days.

(21) Appl. No.: 17/504,856

(22) Filed: Oct. 19, 2021

(65) Prior Publication Data

US 2022/0126867 A1   Apr. 28, 2022

Related U.S. Application Data

(60) Provisional application No. 63/105,481, filed on Oct. 26, 2020.

(51) Int. Cl.
*B62D 6/04* (2006.01)
*B60W 60/00* (2020.01)
(Continued)

(52) U.S. Cl.
CPC . *B60W 60/0015* (2020.02); *B60W 2510/0666* (2013.01); *B60W 2510/18* (2013.01);
(Continued)

(58) Field of Classification Search
CPC ..... B60W 60/0015; B60W 2510/0666; B60W 2510/18; B60W 2510/20; B60W 2555/20;
(Continued)

(56) References Cited

U.S. PATENT DOCUMENTS 11,531,113 B1 * 12/2022 Bristow ................ G06V 20/58
2018/0224859 A1 * 8/2018 Brudner ................ G01W 1/02
(Continued)

FOREIGN PATENT DOCUMENTS

EP              3683098 A1 *  7/2020  ............. B60R 11/04
WO        1993005492 A1     3/1993

*Primary Examiner* — Russell Frejd
*Assistant Examiner* — Chanmin Park
(74) *Attorney, Agent, or Firm* — Perkins Coie LLP

(57) ABSTRACT

An autonomous vehicle includes a detection system for identifying the presence changes in wind incident on the autonomous vehicle, particularly wind gusts. The detection system may include one or more wind sensors, particularly those configured to detect wind incident on the vehicle from a direction that is transverse or perpendicular to the direction of motion of the autonomous vehicle. Additionally, systems may be present that correlate the detected wind gusts to changes in the behavior of the autonomous vehicle. The autonomous vehicle may react to the detected wind gusts by altering the vehicle's trajectory, by stopping the vehicle, or by communicating with a control center for further instructions.

20 Claims, 6 Drawing Sheets

(51) Int. Cl.
  *G01P 5/06* (2006.01)
  *G01P 5/16* (2006.01)
  *G01P 5/24* (2006.01)

(52) U.S. Cl.
  CPC ..... *B60W 2510/20* (2013.01); *B60W 2555/20* (2020.02); *B60W 2556/45* (2020.02); *B60W 2710/0677* (2013.01); *B60W 2710/18* (2013.01); *B60W 2710/20* (2013.01); *G01P 5/06* (2013.01); *G01P 5/16* (2013.01); *G01P 5/24* (2013.01)

(58) Field of Classification Search
  CPC ..... B60W 2556/45; B60W 2710/0677; B60W 2710/18; B60W 2710/20; B60W 30/02; B60W 60/00182; B60W 40/02; G01P 5/06; G01P 5/16; G01P 5/24; G01P 5/00; B62D 6/04
  See application file for complete search history.

(56) References Cited

U.S. PATENT DOCUMENTS

| | | |
|---|---|---|
| 2019/0367104 A1 | 12/2019 | Damon |
| 2020/0047823 A1* | 2/2020 | Pereira .................. B62D 37/02 |
| 2020/0207331 A1* | 7/2020 | Chang .................. G01P 13/025 |
| 2020/0307467 A1 | 10/2020 | Skinner |
| 2020/0353876 A1 | 11/2020 | Li et al. |
| 2022/0187924 A1* | 6/2022 | Fribus .................... B60K 37/06 |

* cited by examiner

WIND GUST DETECTION BY AN AUTONOMOUS VEHICLE

CROSS-REFERENCE TO RELATED APPLICATIONS

This application claims priority to U.S. Provisional Patent Application No. 63/105,481, titled "WIND GUST DETECTION BY AN AUTONOMOUS VEHICLE," filed Oct. 26, 2020, the disclosures of which are hereby incorporated by reference herein.

TECHNICAL FIELD

The present disclosure relates generally to autonomous vehicles. More particularly, the present disclosure is related to detecting wind gusts impinging on an Autonomous Vehicle (AV) on the vehicle's broad side, generally transverse to the direction of the vehicle's motion. Operating an AV appropriately in response to the detection of a wind gust is also relevant to this disclosure.

BACKGROUND

One aim of autonomous vehicle technologies is to provide vehicles that can safely navigate towards a destination with limited or no driver assistance. In some cases, an autonomous vehicle may encounter changing weather conditions, including varying wind conditions such as wind gusts. Wind gusts may alter the forces on an autonomous vehicle, particularly on a high-profile vehicle such as a tractor-trailer or other class 8 vehicle. These changes in forces can cause the autonomous vehicle to veer out of its intended lane on a roadway or result in other unsafe conditions if corrective action is not taken in response a gust of wind. Further, in some jurisdictions, when wind gusts exceed a threshold speed, high-profile vehicles may be required to pull over, off of the roadway, until the wind abates.

SUMMARY

Detection of wind gusts is important for the operation of an autonomous vehicle to ensure the safety of persons and property surrounding the autonomous vehicle. Systems and methods are described herein that allow an autonomous vehicle to detect the presence of wind gusts and to compensate for those changes in wind for safe and lawful operation.

In some implementations, a system is provided that includes an autonomous vehicle with: a wind gust detection subsystem, an in-vehicle control computer, and an autonomous control subsystem. The in-vehicle control computer includes a wind gust detection module and a wind gust compensation module. The wind gust detection module is configured to receive information from the wind gust detection subsystem and to generate a determination of a wind gust and wind gust characteristics. The wind gust compensation module is configured to accept the determination of a wind gust and wind gust characteristics from the wind gust detection module.

The following features may be present in the system in any reasonable combination. The wind gust detection subsystem may include one or more wind sensors mounted, or located, on an external portion of the autonomous vehicle. The one or more wind sensors may include any of the following: a mechanical anemometer with rotating cups and a wind vane; a pitot tube anemometer; and an ultrasonic anemometer. The one or more wind sensors may include an ultrasonic anemometer. The one or more wind sensors may be mounted on a sensor support bar or a sensor housing. The one or more wind sensors may be mounted in one or more of the following locations: generally toward the midline of the autonomous vehicle; towards the passenger side of the autonomous vehicle; and toward the driver's side of the autonomous vehicle. The system may include an oversight system in communication with the autonomous vehicle, the oversight system configured to receive wind velocity information from any of: the wind gust detection module; sensors of the wind gust detection subsystems; and the wind gust compensation module. The oversight system may be configured to send a minimal risk condition maneuver command to the autonomous vehicle when the oversight system determines that the autonomous vehicle is experiencing wind velocities that meet a predetermined threshold. The oversight system may be configured to relay wind gust information to one or more additional autonomous vehicles which may be impacted by the wind velocities experienced by the autonomous vehicle that sent the wind velocity data.

Other implementations may provide a method that includes: detecting, by a wind gust detection subsystem of an autonomous vehicle, the presence of a wind gust; determining, by a wind gust detection module of the autonomous vehicle, characteristics of the wind gust; determining, by the wind gust compensation module of the autonomous vehicle, that a change of trajectory or route for the autonomous vehicle is required to safely operate the autonomous vehicle; determining, by the wind gust compensation module, a course of action; and modifying the trajectory or route of the autonomous vehicle to comply with course of action determined by the wind gust compensation module.

The following features may be included in the method in any reasonable combination. The method may include sending, by a network communications module of the autonomous vehicle, wind velocity information to an oversight system. The oversight system may issue a minimal risk condition (MRC) maneuver command to one or more autonomous vehicles in communication with the oversight system. The issuance, or issuing, of a minimal risk condition maneuver command by the oversight system to one or more autonomous vehicles in communication with the oversight system further comprises determining, by the oversight system, whether each of the one or more autonomous vehicles meets a set of predetermined threshold conditions for an MRC maneuver. The method may include sending, by the oversight system, wind velocity information to one or more autonomous vehicles in communication with the oversight system. The method may include selecting a mounting point for one or anemometers on the autonomous vehicle as part of the wind gust detection subsystem. Selecting a mounting point for one or more anemometers may include any of: the use of experimentally obtained data; and the use of computer modeling. In the method, modifying the trajectory or route of the autonomous vehicle to comply with course of action determined by the wind gust compensation module may include: receiving, by the autonomous control unit, the course of action from the wind gust compensation module; and signaling, by the autonomous control unit, changes to any of: the steering subsystem; the braking subsystem; and the engine power output subsystem. The course of action determined by the wind gust compensation module may include a minimal risk condition maneuver.

Further provided herein are implementations of an apparatus that includes at least one processor and at least one memory including instructions which, when executed by the at least one processor, cause the at least one processor to at least perform the method described herein. The apparatus may further include a network communications unit; and instructions on the at least one memory comprising: sending, by a network communications module of the autonomous vehicle, wind velocity information to an oversight system.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Vehicles traversing highways and roadways are legally required to maintain safe operation of the vehicle. For autonomous vehicles, particularly autonomous tractor trailers, detection of wind gusts is essential for lawful and safe operation of the vehicle. Described below in detail are apparatus, systems, and methods for the safe and lawful operation of an autonomous vehicle on a roadway, including the detection of extreme changes in wind, wind gusts, and the operation of the autonomous vehicle in to compensate for these wind gusts.

Autonomous Truck

Figure 1:
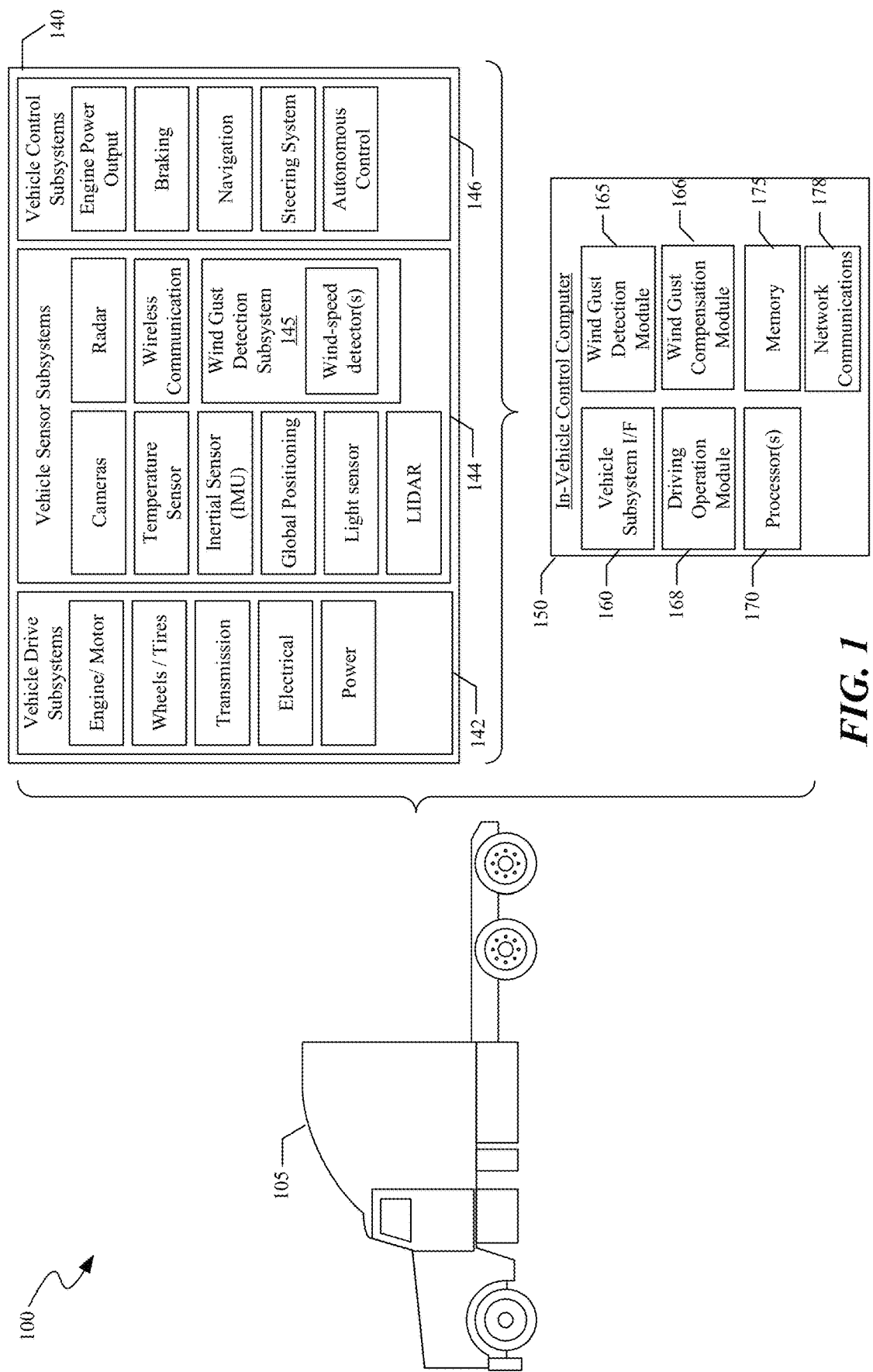
FIG. 1 illustrates a schematic diagram of a system including an autonomous vehicle.

FIG. 1 shows a system 100 that includes a tractor 105 of an autonomous truck. The tractor 105 includes a plurality of vehicle subsystems 140 and an in-vehicle control computer 150. The plurality of vehicle subsystems 140 may include vehicle drive subsystems 142, vehicle sensor subsystems 144, and vehicle control subsystems. An engine or motor, wheels and tires, a transmission, an electrical subsystem, and a power subsystem may be included in the vehicle drive subsystems. The engine of the autonomous truck may be an internal combustion engine, a fuel-cell powered electric engine, a battery powered electrical engine, a hybrid engine, or any other type of engine capable of moving the wheels on which the tractor 105 moves. The tractor 105 may have multiple motors or actuators to drive the wheels of the vehicle, such that the vehicle drive subsystems 142 can include two or more electrically driven motors. The transmission may include a continuous variable transmission or a set number of gears that translate the power created by the engine into a force that drives the wheels of the vehicle. The vehicle drive subsystems may include an electrical system that monitors and controls the distribution of electrical current to components within the system, including pumps, fans, and actuators. The power subsystem of the vehicle drive subsystem may include components that regulate the power source of the vehicle.

Vehicle sensor subsystems 144 can include sensors for general operation of the autonomous truck 105 and a wind gust detection subsystem 145. The sensors for general operation of the autonomous vehicle may include cameras, a temperature sensor, an inertial sensor (IMU), a global positioning system, a light sensor, a LIDAR system, a radar system, and wireless communications.

An anemometer mounted on the exterior of the autonomous vehicle 105 is part of the wind gust detection subsystem 145. The anemometer, that is a wind speed detector, of the wind gust detection subsystem 145 is configured to measure the speed of the wind. In some implementations, the anemometer may also detect the direction from which the wind is coming, so that the anemometer measures the velocity of the wind. The anemometer may be a mechanical anemometer, a pitot tube anemometer, an ultrasonic anemometer, or any other device configured to measure gusts of wind forceful enough to require compensation in trajectory, braking, or throttle (e.g., vehicle speed) by an autonomous vehicle. A mechanical anemometer may include three rotating cups to measure average speed and a wind vane to detect the direction from which the wind originates. A pitot tube anemometer may be used to measure pressure differences or changes at one or more locations on the exterior of the autonomous vehicle 105. An ultrasonic wind sensor may include a system with three or more ultrasonic elements operating in a 2-axis configuration. Any anemometer that is part of the wind gust detection subsystem 145 will be configured to operate in a wide range of ambient temperatures, including freezing temperatures, as well as to have sufficiently quick response and transmission times so that wind gust may be detected in a small enough period of time for the autonomous vehicle to take appropriate action safely. In some implementations, the wind gust detection subsystem 145 may include two or more anemometers mounted externally on the autonomous vehicle. Alternatively, or additionally, the wind gust detection subsystem may comprise means for detecting the yaw (or yaw rate) of the vehicle, such as an IMU or gyroscope. Further, alternatively or additionally, the wind gust detection subsystem may comprise a means for discerning that the steering torque to maintain the planned route and trajectory of the vehicle may be more or less than is expected, indicating an external force on the vehicle.

The vehicle control subsystem 146 may be configured to control operation of the autonomous vehicle, or truck, 105 and its components. Accordingly, the vehicle control subsystem 146 may include various elements such as an engine power output subsystem, a braking subsystem or unit, a navigation unit, a steering subsystem, and an autonomous control unit. The engine power output subsystem may control the operation of the engine, including the torque produced or horsepower provided, as well as provide control the gear selection of the transmission. The brake unit can include any combination of mechanisms configured to decelerate the autonomous vehicle 105. The braking subsystem or unit can use friction to slow the wheels in a standard manner. The braking subsystem may include an Anti-lock brake system (ABS) that can prevent the brakes from locking up when the brakes are applied. The navigation unit may be any system configured to determine a driving path or route for the autonomous vehicle 105. The navigation unit may additionally be configured to update the driving path dynamically while the autonomous vehicle 105 is in operation. In some embodiments, the navigation unit may be configured to incorporate data from the GPS device and one or more predetermined maps so as to determine the driving path for the autonomous vehicle 105. The steering system may represent any combination of mechanisms that may be operable to adjust the heading of autonomous vehicle 105 in an autonomous mode or in a driver-controlled mode.

The autonomous control unit may represent a control system configured to identify, evaluate, and avoid or otherwise negotiate potential obstacles in the environment of the autonomous vehicle 105. In general, the autonomous control unit may be configured to control the autonomous vehicle 105 for operation without a driver or to provide driver assistance in controlling the autonomous vehicle 105. In some embodiments, the autonomous control unit may be configured to incorporate data from the GPS device, the RADAR (or radar) unit, the LIDAR (or LiDAR) unit, the cameras, and/or other vehicle subsystems to determine the driving path or trajectory for the autonomous vehicle 105.

An in-vehicle control computer 150, which may be referred to as a controller (e.g., an autonomous domain controller (ADC) with a vehicle control unit (VCU)), may include a vehicle subsystem interface 160, a driving operation module 168, one or more processors 170, a wind gust detection module 165, a wind gust compensation module 166, a memory 175, and a network communications subsystem 178. This in-vehicle control computer 150 controls many, if not all, of the operations of the autonomous truck 105 in response to information from the various vehicle subsystems 140. The one or more processors 170 execute the operations associated with the wind gust detection module 165 that allow the system to determine that the wind is changing, particularly that wind gusts are occurring. Data from the wind gust detection subsystem 145 is provided to the wind gust detection module 165 so that the characteristics of the wind gust, such as velocity and duration, may be identified. The wind gust compensation module 166 receives the wind gust characteristics from the wind gust detection module 165 and in turn determines what course of action should be taken by the autonomous truck 105. Data from other vehicle sensor subsystems 144 may be provided to the wind gust compensation module 166 so that the course of action may be appropriately determined. Alternatively, or additionally, the wind gust compensation module 166 may determine the course of action in conjunction with another operational or control module, such as the driving operation module 168.

The memory 175 may contain additional instructions as well, including instructions to transmit data to, receive data from, interact with, or control one or more of the vehicles drive subsystem 142, the vehicle sensor subsystem 144, and the vehicle control subsystem 146. The in-vehicle control computer (i.e., controller) 150 may control the function of the autonomous vehicle 105 based on inputs received from various vehicle subsystems (e.g., the vehicle drive subsystem 142, the vehicle sensor subsystem 144, and the vehicle control subsystem 146). Additionally, the controller 150 may send information to the vehicle control subsystems 146 to direct the trajectory, velocity, signaling behaviors, and the like, of the autonomous vehicle 105. The autonomous control vehicle control subsystem may receive a course of action to be taken from the wind gust compensation module 166 of the controller 150 and consequently relay instructions to other subsystems to execute the course of action.

Autonomous Truck Oversight System

Figure 2:
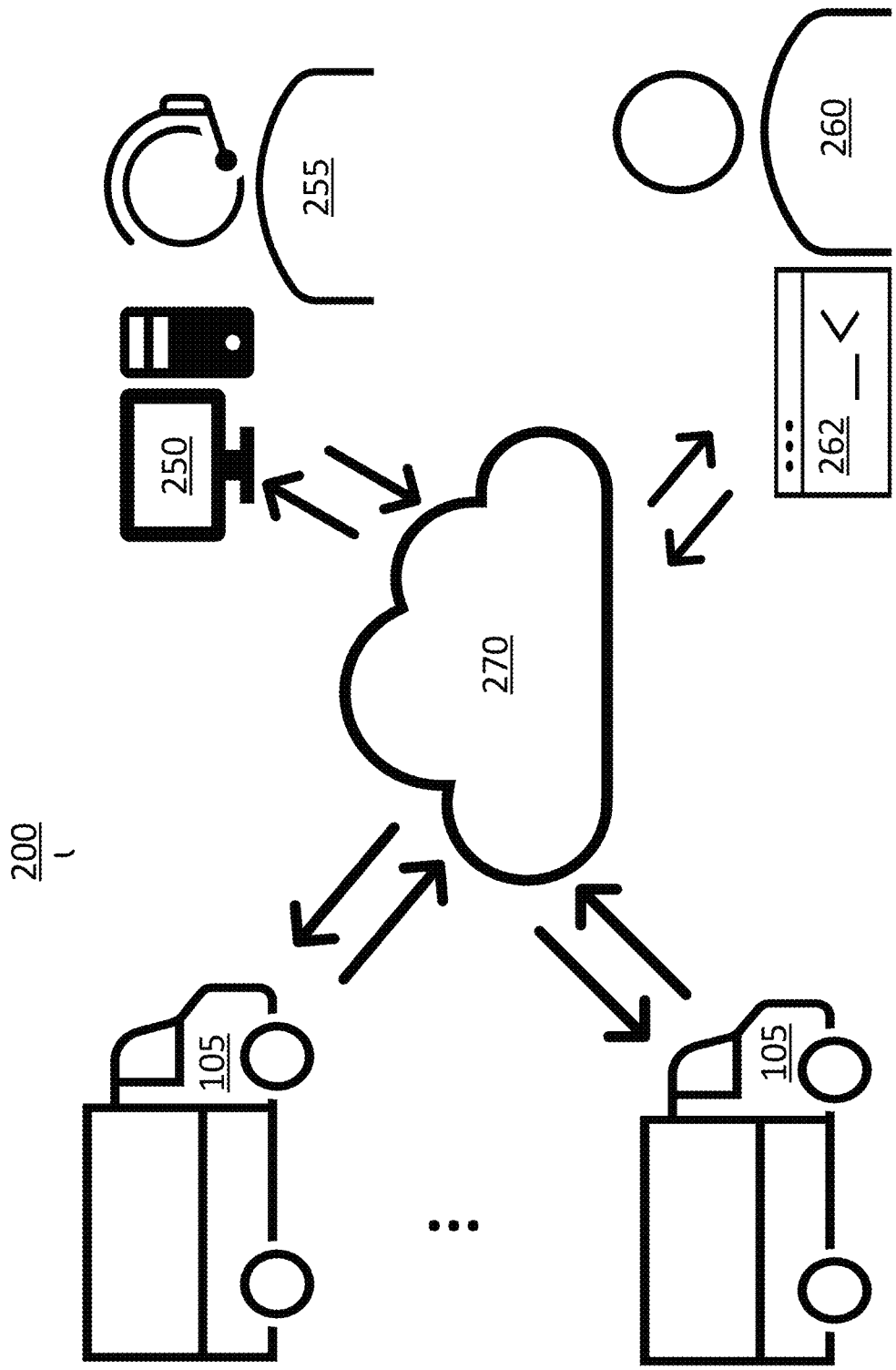
FIG. 2 illustrates a system that includes one or more autonomous vehicles, a control center or oversight system with a human operator (e.g., a remote center operator (RCO)), and an interface for third-party interaction.

FIG. 2 illustrates a system 200 that includes one or more autonomous vehicles 105, a control center or oversight system 250 with a human operator 255, and an interface 262 for third-party 260 interaction. A human operator 255 may also be known as a remoter center operator (RCO). Communications between the autonomous vehicles 105, oversight system 250 and user interface 262 take place over a network 270. In some instances, where not all the autonomous vehicles 105 in a fleet are able to communicate with the oversight system 250, the autonomous vehicles 105 may communicate with each other over the network 270 or directly. As described with respect to FIG. 1, the in-vehicle control computer 150 of each autonomous vehicle 105 may include a module for network communications 178.

An autonomous truck may be in communication with an oversight system. The oversight system may serve many purposes, including: tracking the progress of one or more autonomous vehicles (e.g., an autonomous truck); tracking the progress of a fleet of autonomous vehicles; sending maneuvering instructions to one or more autonomous vehicles; monitoring the health of the autonomous vehicle (s); monitoring the status of the cargo of each autonomous vehicle in contact with the oversight system; facilitate communications between third parties (e.g., law enforcement, clients whose cargo is being carried) and each, or a specific, autonomous vehicle; allow for tracking of specific autonomous trucks in communication with the oversight system (e.g., third-party tracking of a subset of vehicles in a fleet); arranging maintenance service for the autonomous vehicles (e.g., oil changing, fueling, maintaining the levels of other fluids); alerting an affected autonomous vehicle of changes in traffic or weather that may adversely impact a route or delivery plan; pushing over the air updates to autonomous trucks to keep all components up to date; and other purposes or functions that improve the safety for the autonomous vehicle, its cargo, and its surroundings.

For an autonomous vehicle (AV) with a wind gust detection subsystem and module, as described with respect to FIG. 1, the oversight system may receive data about wind gust activity (e.g., wind velocity data) from the autonomous vehicle. This information about wind gust activity may allow the oversight system to warn autonomous vehicles that have yet to encounter the wind gust of the condition, and those autonomous vehicles may alter their route, trajectory, or vehicle controls accordingly. Wind gust activity information received by the oversight system from one or more autonomous vehicles may also factor into the decision of the oversight system to issue an MRC maneuver command to those vehicles or a subset of vehicles in a fleet that may be impacted by the wind activity.

An oversight system may also determine performance parameters of an autonomous vehicle or autonomous truck, including any of: data logging frequency, compression rate, location, data type; communication prioritization; how frequently to service the autonomous vehicle (e.g., how many miles between services); when to perform a minimal risk condition (MRC) maneuver and monitoring the vehicle's progress during the MRC maneuver; when to hand over control of the autonomous vehicle to a human driver (e.g., at a destination yard); ensuring an autonomous vehicle performs or conforms to legal requirements at checkpoints and weight stations; give feedback regarding the identification of an object over which an autonomous vehicle passes while in transit and it unable to identify with high certainty, and the like.

To allow for communication between autonomous vehicles in a fleet and an oversight system or command center, each autonomous vehicle may be equipped with a communication gateway (e.g., network communications unit). The communication gateway may have the ability to do any of the following: allow for AV to oversight system communication (i.e. V2C) and the oversight system to AV communication (C2V); allow for AV to AV communication within the fleet (V2V); transmit the availability or status of the communication gateway; acknowledge received communications; ensure security around remote commands between the AV and the oversight system; convey the AV's location reliably at set time intervals; enable the oversight system to ping the AV for location and vehicle health status; allow for streaming of various sensor data directly to the command or oversight system; allow for automated alerts between the AV and oversight system; comply to ISO 21434 standards; and the like.

An oversight system or command center may be operated by one or more humans, also known as an operator or a remote center operator (RCO). The operator may set thresholds for autonomous vehicle health parameters, so that when an autonomous vehicle meets or exceeds the threshold, precautionary action may be taken. An autonomous vehicle whose system health data meets or exceeds a threshold set at the oversight system or by the operator may receive instructions that are automatically sent from the oversight system to perform the precautionary action.

The operator may be made aware of situations affecting one or more autonomous vehicles in communication with, or being monitored by, the oversight system that the affected autonomous vehicle(s) may not be aware of Such situations may include: irregular or sudden changes in traffic flow (e.g., traffic jam or accident); emergency conditions (e.g., fire, sinkhole, bridge failure, dangerous debris along a route); large or ambiguous road debris (e.g., object unidentifiable by the autonomous vehicle); law enforcement activity on the roadway (e.g., car chase or road clearing activity); and the like. These types of situations that may not be detectable by an autonomous vehicle may be brought to the attention of the oversight system operator through traffic reports, law enforcement communications, data from other vehicles that are in communication with the oversight system, reports from drivers of other vehicles in the area, and similar distributed information venues. An autonomous vehicle may not be able to detect such situations because of limitations of sensor systems (e.g., unable to obtain a clear image or inability of analysis module to confidently identify an object in an image) or lack of access to the information distribution means (e.g., no direct communication with weather agency). An operator at the oversight system may push such information to affected autonomous vehicles that are in communication with the oversight system. The affected autonomous vehicles may proceed to alter their route, trajectory, or speed in response to the information pushed from the oversight system. In some instances, the information received by the oversight system may trigger a threshold condition indicating that MRC (minimal risk condition) maneuvers are warranted; alternatively, or additionally, an operator may evaluate a situation and determine that an affected autonomous vehicle should perform a MRC maneuver and subsequently send such instructions to the affected vehicle. In these cases, each autonomous vehicle receiving either information or instructions from the oversight system or the oversight system operator uses its on-board computing unit (i.e., VCU) to determine how to safely proceed, including performing a MRC maneuver that includes pulling-over or stopping.

An oversight system or command center may allow a third party to interact with the oversight system operator, with an autonomous truck, or with both the human system operator and an autonomous truck. A third party may be a customer whose goods are being transported, a law enforcement or emergency services provider, or a person assisting the autonomous truck when service is needed.

Method for Operating an Autonomous Truck

Figure 3:
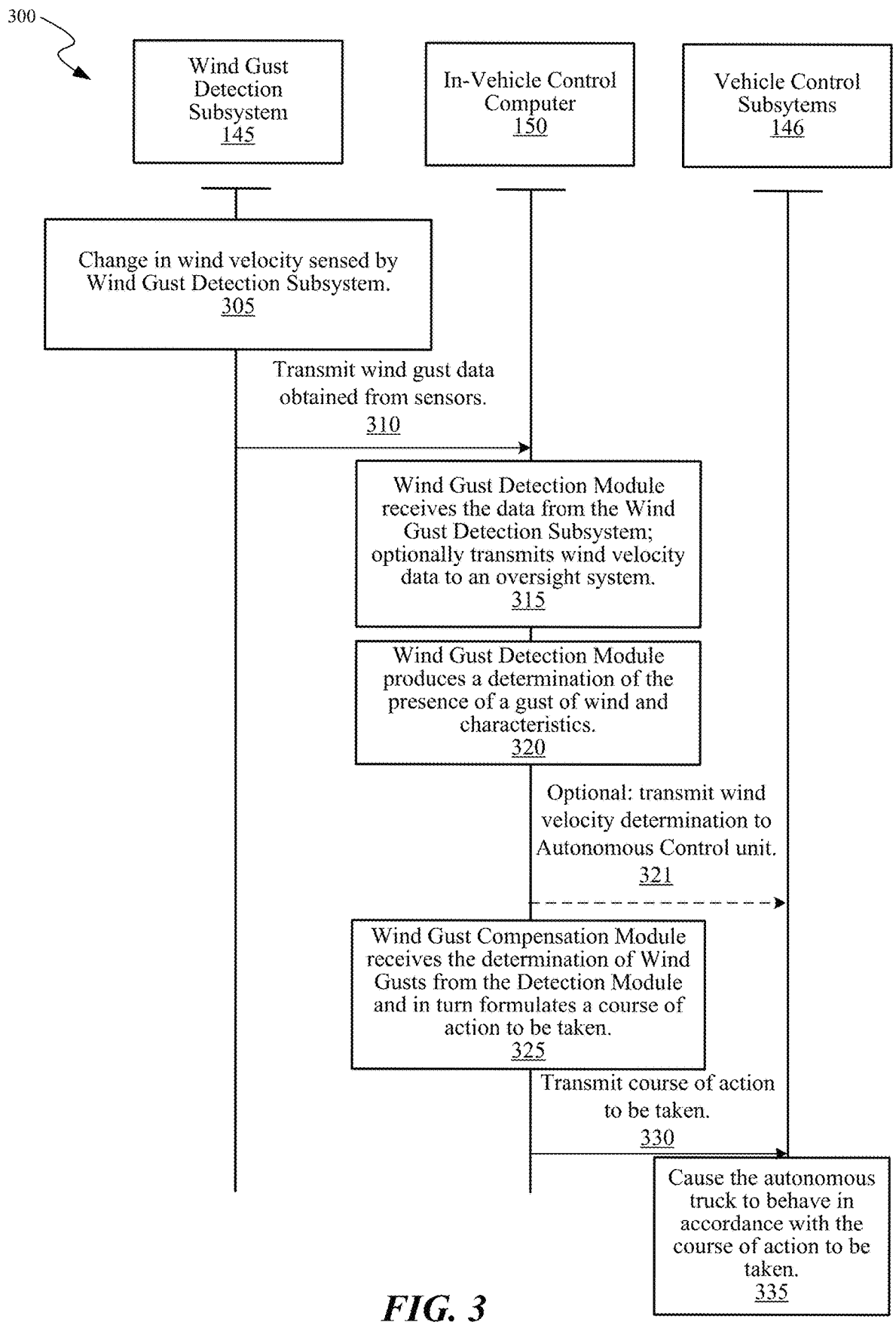
FIG. 3 is an exemplary method for detecting wind gusts and operating an autonomous vehicle to compensate for a wind gust.

FIG. 3 shows a flow diagram 300 for the detection of wind gusts and compensation by the autonomous vehicle for the presence of wind gusts. The wind gust detection subsystem 145 measures changes in wind velocity in step 305. These changes in the wind may be sensed and transmitted by the wind gust detection subsystem 145 to the in-vehicle control computer system (controller) 150, as in step 310. The wind gust detection module, which is part of the in-vehicle control computer, receives the data transmitted from the wind gust detection system, in step 315. Alternatively, or additionally, in step 315, the in-vehicle control computer system may send wind velocity data to an oversight system via the network communications module (e.g., a communications gateway). Then, the wind gust detection module produces a determination of the presence of a wind gust and characteristics of the wind gust in step 320. The determination and characterization of wind gusts made by the wind gust detection module may include a wind velocity and the duration of gusts, as well as the rate of change of the velocity of wind gusts. In optional step 321, this determination and characterization of the detected wind gusts may be sent to the autonomous control unit, which is part of the vehicle control subsystems. Subsequent to receiving the determination and characterization of the detected wind gusts, the autonomous control unit may formulate the course of action to be taken by the autonomous vehicle. Alternatively, this determination and characterization of wind gusts may be used by the wind gust compensation module to formulate a course of action to be taken, as in step 325. The course of action to be taken may include slowing, stopping, moving into a shoulder, changing route, changing lane while staying on the same general route, altering steering angle, increasing vehicle throttle to maintain a forward speed, a minimal risk condition (MRC) maneuver, and the like. The course of action to be taken may include initiating communications with any oversight or human interaction systems present on the autonomous vehicle. The course of action to be taken may then be transmitted from the in-vehicle control computer 150 to the various vehicle control subsystems in step 330. The vehicle control subsystems may then cause the autonomous truck 105 to operate in accordance with the course of action to be taken that was received from the in-vehicle control computer 150 in step 335.

Wind Sensor Mounting on an Autonomous Vehicle

Figure 4A:
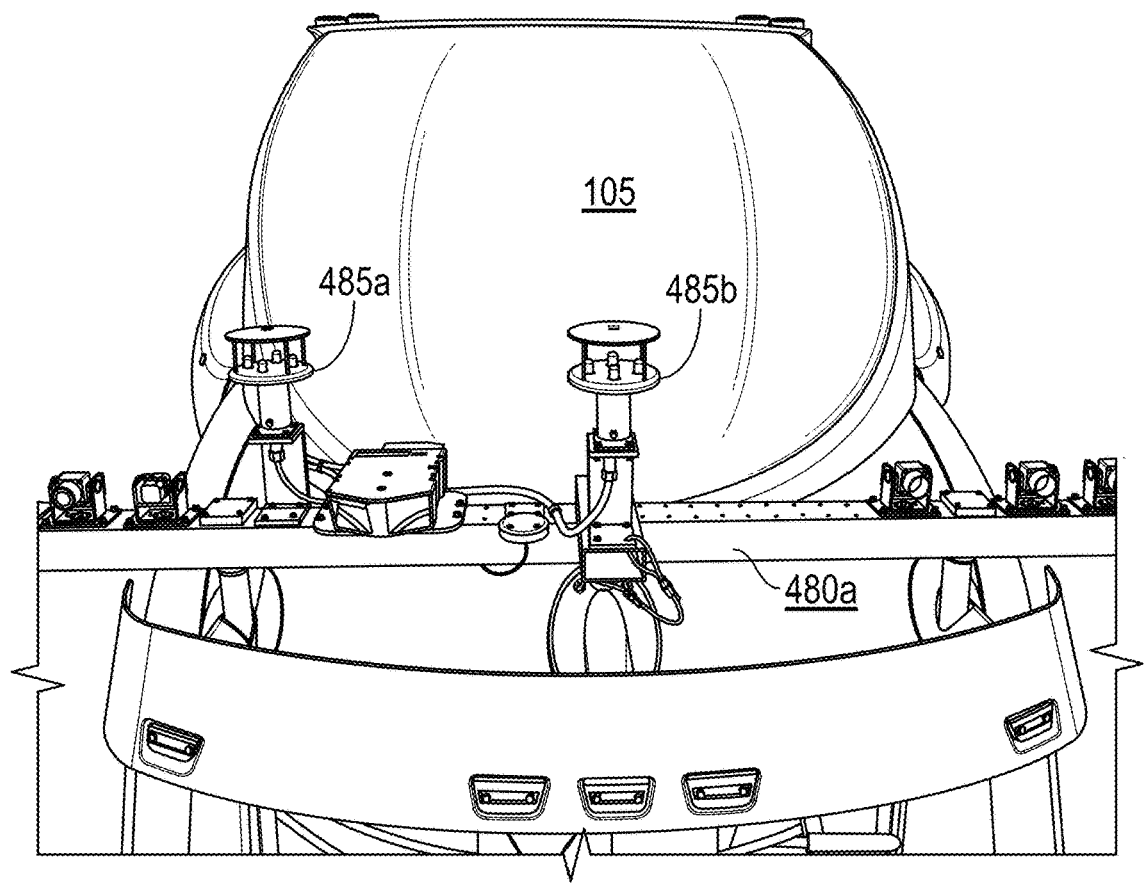
FIGS. 4A and 4B show the front portions of exemplary autonomous trucks with various placements of an anemometer.
Figure 4B:
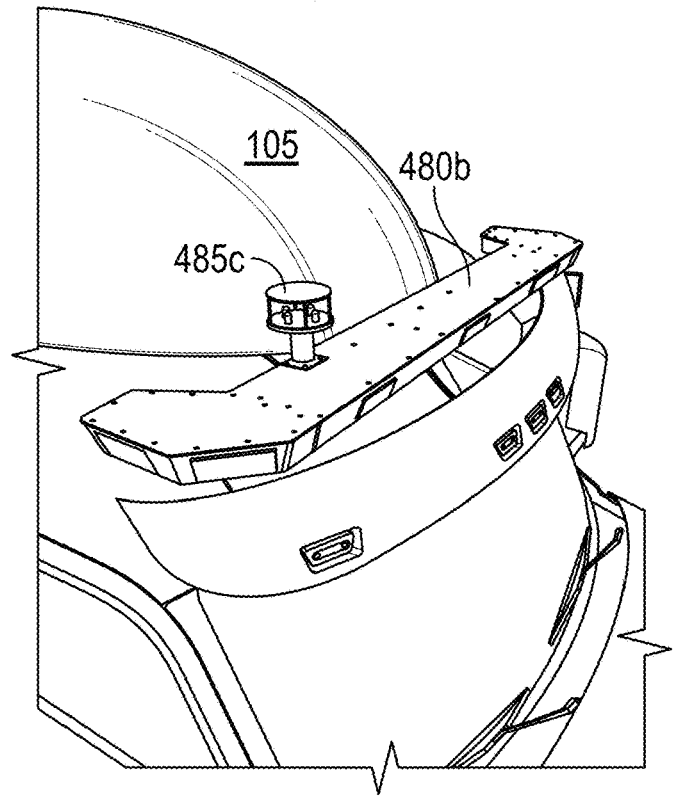

FIGS. 4A and 4B show the front portions of exemplary autonomous trucks with various placements of an anemometer. In these views of the front end of autonomous trucks 105, one or more anemometer 485a, 485b, 485c is mounted on a sensor support bar 480a in FIG. 4A or a sensor housing 480b (as shown in FIG. 4B). In FIGS. 4A and 4B, the anemometers shown are ultrasonic wind sensors. Such ultrasonic wind sensors can measure a wide range of wind velocities and may be sensitive enough to detect wind with as little as 0.01 m/s speed from almost any direction around the sensor. The data acquisition and transmission rate may be varied, so as to suit the needs of the autonomous vehicle's computational and operational needs. Though ultrasonic wind sensors are shown, any suitable type of anemometer, may be used. Ultrasonic anemometers may include 3 or 4 or more transducers to emit and measure ultrasonic pulses. Types of anemometers that may be used include: cup anemometers; vane anemometers; hot-wire anemometers; laser doppler anemometers; windmill anemometers; pressure anemometers (e.g., pitot tube anemometers); ping-pong ball anemometers; ultrasonic anemometers; and the like.

The one or more anemometers may be placed in a location that is exposed to wind at a height significant to the operation of a high-profile vehicle, such as a class-8 vehicle or a tractor, including a tractor-trailer vehicle. In FIG. 4A, the sensor support bar 480a is mounted above the cab area, at a forward-facing portion of the tractor of the vehicle 105. This sensor support bar 480a is in a relatively high position on the vehicle 105, as well as possibly being isolated from a portion of the vibration associated with the vehicle by damping components of the sensor support bar 480a or the mounts used to secure the sensor support bar 480a to the vehicle 105.

A relatively high position on the vehicle may be a location above the cab of a tractor, such as on the roof of a cab portion of a vehicle. Alternatively, a relatively high position on a vehicle may be any location within 30 cm (11.81 inches) from the roofline of a vehicle. Similarly, sensor housing 480b shown in FIG. 4B is located above the cab of the vehicle's tractor, and so it is in a relatively high position. The one or more anemometers may be placed on a roof portion of the autonomous vehicle, and the roof portion may be above the cab of the vehicle. It may also be advantageous to select an area on the vehicle 105 for mounting the anemometers 485a, 485b, 485c which is not the site of turbulent air flow over the vehicle surface when the vehicle is in motion; laminar air flow may be preferable.

In FIG. 4A, a centrally mounted anemometer 485a and a passenger side anemometer 485b are shown. The centrally mounted anemometer 485a is mounted on the sensor support bar 480a in a position that is the general vicinity of the mid-line of the vehicle 105. The passenger side anemometer 485b is mounted on the sensor support bar 480a in an area above where the passenger seat is located in the vehicle cab. In areas where vehicles are driven on the right-hand side of the road, the passenger side is generally the right-hand side portion of the vehicle and the driver's side is the left-hand side portion of the vehicle, when one is sitting in the vehicle. In FIG. 4B, the anemometer 485c is mounted on the sensor housing 480b off-center, toward the passenger side of the vehicle. The anemometer mounting positions shown in FIGS. 4A and 4B are exemplary and are not meant to be limiting. The selection of the mounting location of the anemometer on the autonomous vehicle may be based on experimentation, modeling, or both experimentation and modeling.

Figure 5:
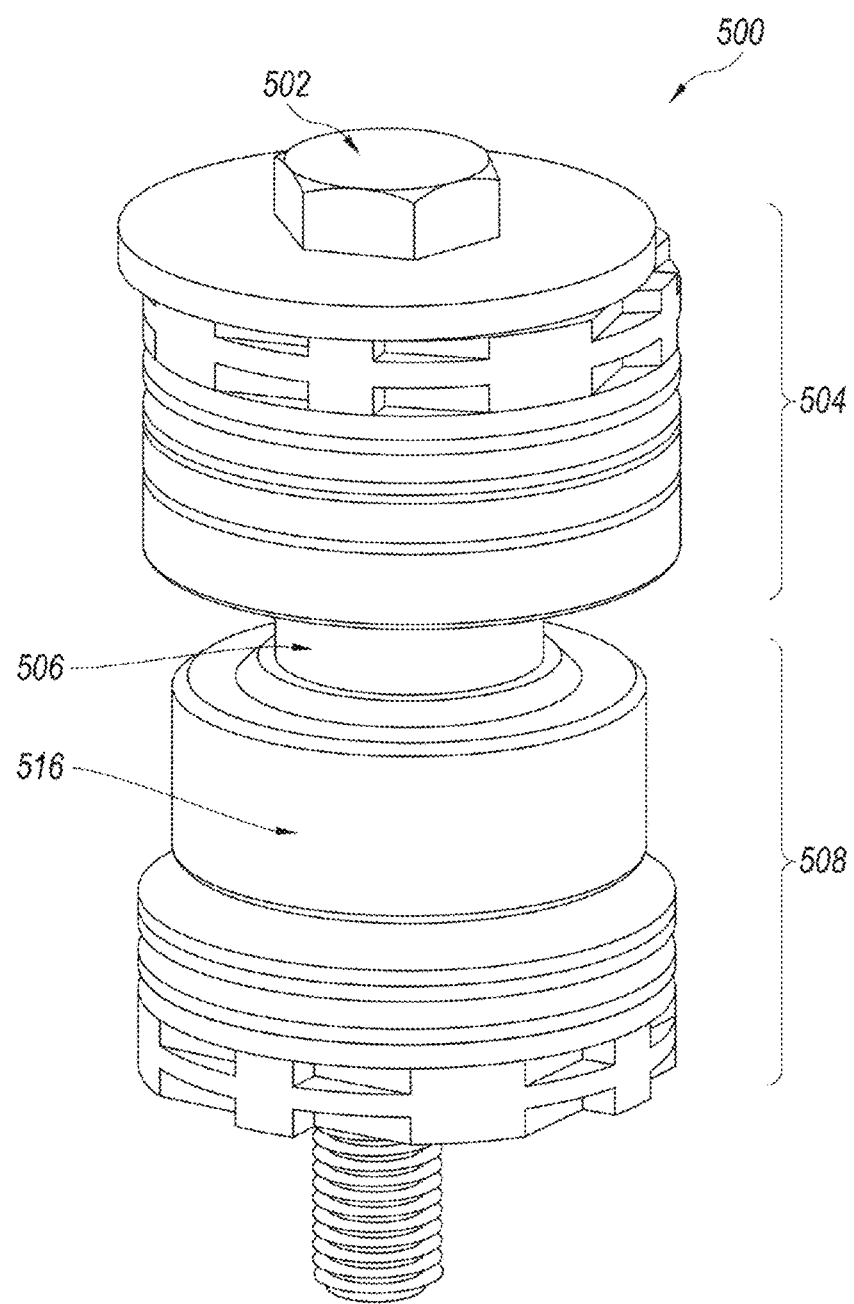
FIG. 5 is a schematic of a vibration mitigating mount.

The sensor housing 480b may also serve to isolate the sensors within the housing, as well as the externally mounted anemometer 485c, from vibration associated with the vehicle because of the nature of the mounting mechanism of the housing 480b to the vehicle 105. The mounting mechanism may damp, that is reduce the amplitude of, vibration from the vehicle by the use of specific materials (e.g., rubber) or the use of a damping configuration of components. A damping configuration of components may include springs, patterned or textured materials, hydraulics, and the like. In some implementations, the mounting mechanism may include a stack of two sets of washers through which a screw fits. The washers may be Bellville washers, Bellville disc springs, may include a ball joint swivel bearing, may include a spherical bearing, may include a flat washer, a rubber washer, or an elastomeric isolator. FIG. 5 is a schematic of an exemplary vibration mitigating mounting mechanism 500 that may be used with the sensor housing 480b or sensor support bar 480a. The mounting mechanism 500 shown in FIG. 5 a threaded screw 502, a first set of a plurality of washers 504, a cylinder 506 that through which the threaded screw 502 is inserted, and a second set of a plurality of washers 508. The washers 504, 508 may be of the type described above.

The experimentation may indicate which mounting position on a vehicle yields the most accurate wind direction and speed information (e.g., wind velocity information) from an anemometer as compared to the known wind velocity, referred to in some instances as the "ground truth" wind velocity value. Additionally, experimentation may indicate which mounting position yields the most accurate wind direction and speed (e.g., wind velocity) information when a vehicle is in motion over various constant velocities. That is to say, experimentation may show which mounting position on an autonomous vehicle is best able to determine which portion of apparent wind is due to the vehicle's velocity and which is due to external wind for a predetermined set of representative velocities. The predetermined set of representative velocities may be intervals of 5 m/s, such as 5 m/s, 10 m/s, 15 m/s, 20 m/s, 25 m/s, and 30 m/s, and optionally up to 35 m/s. Alternatively, the predetermined set of representative velocities may be intervals of 10 MPH (miles per hour), such as 10 MPH, 20 MPH, 30 MPH, 40 MPH, 50 MPH, and 60 MPH, and optionally up to 70 MPH. Experimental data may be obtained during on-the-road testing in areas with near constant velocity wind, during on-the-road testing with external equipment used to measure ground truth wind velocity. Alternatively, or additionally, experimental data may be obtained using externally applied, artificially created wind, such as using various mechanical means for forced air movement including fans, jets, and blowers that employ air compressors. A wind tunnel may be used to obtain experimental data.

Computer modeling, including, for example, computational flow dynamics, can be used to help identify one or more locations on a vehicle that is suitable for mounting an anemometer for detecting wind velocity accurately. With knowledge of the shape and performance of the anemometer, as well as the surface shape of the vehicle including the mounted anemometer, the flow of air around a vehicle at various sets of predetermined representative velocities may be modeled. The predetermined set of representative velocities may be intervals of 5 m/s, such as 5 m/s, 10 m/s, 15 m/s, 20 m/s, 25 m/s, and 30 m/s, and optionally up to 35 m/s. Alternatively, the predetermined set of representative velocities may be intervals of 10 MPH (miles per hour), such as 10 MPH, 20 MPH, 30 MPH, 40 MPH, 50 MPH, and 60 MPH, and optionally up to 70 MPH.

Experiment 1

A test was conducted in an enclosed space with an ultrasonic anemometer mounted to an autonomous vehicle. The autonomous vehicle used was a tractor, the type which is a class 8 vehicle suitable for connecting to a trailer and hauling goods. The ultrasonic anemometer was mounted to a sensor support bar located above the windscreen (i.e., wind shield) of the vehicle, on the roof of the tractor in an area above the vehicle's cab. The ultrasonic anemometer was mounted toward the passenger's side of the vehicle (i.e., right side of the vehicle when inside the vehicle facing toward the front end of the vehicle) along the sensor support bar. During the test, the autonomous vehicle was stationary. Sources of air flow, fans and blowers, were used to create wind from different directions around the vehicle. The sources of air flow were categorized as a small fan, a blower, and a large industrial fan. The windspeed and direction detected by the ultrasonic anemometer were recorded. The wind direction from the ultrasonic anemometer was compared to the physical location of the wind source with respect to the sensor on the vehicle. The speed of the wind generated by the fans and blower were measured by a reference anemometer when the source was 0 degrees to the anemometer, or head on. This reference windspeed and the directions measured by the physical location of the source to the vehicle enabled the experimenters to determine a wind direction error for the ultrasonic anemometer system, as mounted on the vehicle.

Figure 6:
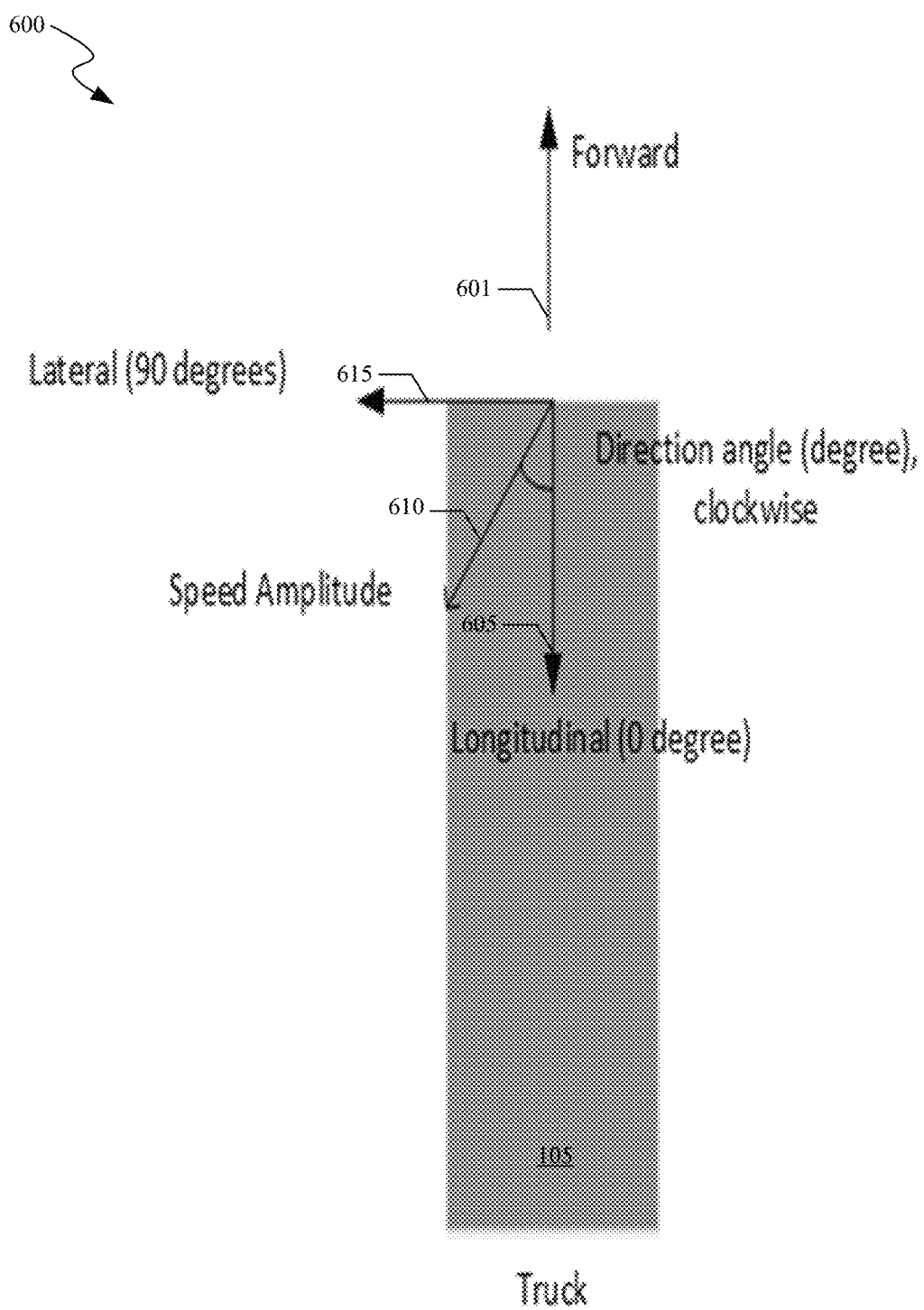
FIG. 6 is a schematic showing the frame of reference used for wind direction used in experiments done with an anemometer mounted on an autonomous vehicle.

Results of this experiment showed that when wind was generated with high speed (e.g., 21 m/s and 27 m/s) and low volume, from the blower, the ultrasonic anemometer tended to report a wind direction that appeared to originate more to the right of the vehicle. Conversely, for a wind source that generated wind with a low speed, but at a high volume (i.e., the industrial fan with a measured reference windspeed of 3.5 m/s), the ultrasonic anemometer measured wind direction that appeared to originate more to the left of the vehicle. The location of the ultrasonic anemometer and possible differences in turbulence caused by the body of the autonomous vehicle may cause these differences. FIG. 6 is a schematic showing the frame of reference 600 used for wind direction used in this experiment. A rectangle representing an autonomous truck 105 is shown in FIG. 6 with the forward direction 601 indicated. The forward direction 601 is the direction in which the truck 105 would travel if travelling straight ahead. Wind coming from directly in front of the truck 105 would be approaching the truck 105 along the longitudinal axis 605 of the vehicle, which is considered to be at 0 degrees. The angle at which the wind approaches the vehicle is measured in a clockwise direction from the longitudinal axis 605. For example, as shown in FIG. 6, the lateral axis 615 of the vehicle is at 90 degrees when wind is coming from the right of the vehicle toward the left (as determined when facing forward 601). An exemplary wind vector 610 is shown between the longitudinal axis 605 and lateral axis 615, and this vector 610 can be resolved into its components along the longitudinal axis 605 and the lateral axis 615. These results can be seen in Table 1.

TABLE 1

Results of Experiment 1

| Wind source | | | | Sensor measurement (averaged) | | |
|---|---|---|---|---|---|---|
| | | Reference wind | | | | |
| Wind source | Speed level | speed (m/s) (measured by reference anemometer) | Reference wind direction (Placement around stationary vehicle) | Wind speed (m/s) | Wind direction | Wind direction error (measurement val—ref val) |
| Blower | 2 | 27 | 0° | 35.93 | −1.2° | −1.2° |
| | | | | 30.21 | −3.0° | −3.0° |
| | | | 5° | 37.62 | 2.0° | −3.0° |
| | | | | 38.32 | 3.3° | −2.7° |
| | | | 10° | 39.71 | 4.6° | −5.4° |
| | | | | 39.91 | 7.7° | −2.3° |
| | | | 20° | 39.54 | 14.6° | −5.4° |
| | | | | 38.43 | 13.7° | −6.3° |
| | | | 45° | 24 | 40.7° | −4.3° |
| | | | | 39.04 | 43.2° | −1.8° |
| | | | 90° | 22.33 | 78.3° | −11.7° |
| | | | | 27.29 | 85.0° | −5° |
| | | | −5° | 36.42 | −7.5° | −2.5° |
| | | | | 35.76 | −14.8° | −9.8° |
| | | | −10° | 38.2 | −12.8° | −2.8° |
| | | | | 35.2 | −12.7° | −2.7° |
| | | | −20° | 34.85 | −23.1° | −3.1° |
| | | | | 29.41 | −24.2° | −4.2° |
| | | | −45° | 33.81 | −45.7° | −0.7° |
| | | | | 35.78 | −43.9° | 1.1° |
| | | | −90° | 36.67 | −91.1° | −1.1° |
| | | | | 33.42 | −91.5° | −1.5° |
| Big fan | 3 | 3.5 | 0° | 2.48 | 0.7° | 0.7° |
| | | | | 1.69 | 9.2° | 9.2° |
| | | | 5° | 2.27 | 10.4° | 5.4° |
| | | | | 1.28 | 7.6° | 2.6° |
| | | | 10° | 1.23 | 22.9° | 12.9° |
| | | | | 1.26 | 8.4° | −1.6° |
| | | | 20° | 1.81 | 23.2° | 3.2° |
| | | | | 2.03 | 24.5° | 2.5° |
| | | | 40° | 1.74 | 43.6° | 3.6° |
| | | | | 1.83 | 39.0° | 1.0° |
| | | | −5° | 0.99 | 13.4° | 18.4° |
| | | | | 1.99 | 0.7° | 5.7° |

TABLE 1-continued

Results of Experiment 1

| Wind source | Speed level | Reference wind | | Sensor measurement (averaged) | | |
|---|---|---|---|---|---|---|
| | | speed (m/s) (measured by reference anemometer) | Reference wind direction (Placement around stationary vehicle) | Wind speed (m/s) | Wind direction | Wind direction error (measurement val—ref val) |
| | | | −10° | 1.13 | 4.1° | 14.1° |
| | | | | 2.05 | 0.8° | 10.8° |
| | | | −20° | 1.36 | −17.1° | 2.9° |
| | | | | 2.94 | −14.0° | 6.0° |
| | | | −40° | 1.76 | −19.5° | 20.5° |
| | | | | 3.25 | −30.4° | 9.6° |

The results from using a small fan, for which reference wind speeds of 4.3 m/s and 5.6 m/s were used, the wind direction detected by the ultrasonic anemometer were not consistently in error one way or the other.

Experiment 2

Computational flow dynamics modeling was used factor in the shape of an autonomous vehicle to determine the wind velocity and direction at different locations of an anemometer mounted on the vehicle. The simulation included the autonomous vehicle being stationary, as well as travelling at various speeds. Also cross-winds of various speeds were simulated.

The anemometer location used in this simulation was on a sensor support bar located on the roof portion of the vehicle, above the cab and windscreen of the vehicle in the center of the vehicle along a lateral axis, as far forward on the sensor support bar as possible. The simulation showed that the selected location would yield close to around 90% of the true wind-speed in the simulation.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

Implementations of the disclosure can be described in view of the following clauses, the features of which can be combined in any reasonable manner.

Clause 1. A system, comprising:
an autonomous vehicle comprising:
a wind gust detection subsystem;
an in-vehicle control computer comprising:
a wind gust detection module, the wind gust detection module configured to receive information from the wind gust detection subsystem and to generate a determination of a wind gust and wind gust characteristics; and
a wind gust compensation module, the wind gust compensation module configured to accept the determination of a wind gust and wind gust characteristics from the wind gust detection module; and an autonomous control subsystem.

Clause 2. The system of clause 1 wherein the wind gust detection subsystem comprises one or more wind sensors mounted, or located, on an external portion of the autonomous vehicle.

Clause 3. The system of clause 2, wherein the one or more wind sensors comprise any of the following:
a mechanical anemometer comprising rotating cups and a wind vane;
a pitot tube anemometer; and an ultrasonic anemometer.

Clause 4. The system of clause 2 wherein the one or more wind sensors comprise an ultrasonic anemometer.

Clause 5. The system of clause 2, wherein the one or more wind sensors are mounted on a sensor support bar or a sensor housing.

Clause 6. The system of clause 5, wherein the one or more wind sensors are mounted in one or more locations comprising any of:
over a cab portion of the autonomous vehicle;
on a roof portion of the autonomous vehicle;
toward a midline of the autonomous vehicle;
towards a passenger side of the autonomous vehicle; and
toward a driver's side of the autonomous vehicle.

Clause 7. The system of clause 1, further comprising an oversight system in communication with the autonomous vehicle, the oversight system configured to receive wind velocity information from any of:
the wind gust detection module;
sensors of the wind gust detection subsystems; and
the wind gust compensation module.

Clause 8. The system of clause 7, wherein the oversight system is further configured to send a minimal risk condition maneuver command to the autonomous vehicle when the oversight system determines that the autonomous vehicle is experiencing wind velocities that meet a predetermined threshold.

Clause 9. The system of clause 8, wherein the oversight system is further configured to relay wind gust information to one or more additional autonomous vehicles which may be impacted by wind velocities experienced by the autonomous vehicle that sent the wind velocity information.

Clause 10. A method, comprising:
detecting, by a wind gust detection subsystem of an autonomous vehicle, a presence of a wind gust;
determining, by a wind gust detection module of the autonomous vehicle, characteristics of the wind gust;
determining, by a wind gust compensation module of the autonomous vehicle, that a change of trajectory or route for the autonomous vehicle is required to safely operate the autonomous vehicle;
determining, by the wind gust compensation module, a course of action; and
modifying a trajectory or route of the autonomous vehicle to comply with course of action determined by the wind gust compensation module.

Clause 11. The method of clause 10, further comprising sending, by a network communications module of the autonomous vehicle, wind velocity information to an oversight system.

Clause 12. The method of clause 11, further comprising receiving, from the oversight system, a minimal risk condition maneuver command, the minimal risk condition maneuver command being issued by the oversight system to one or more autonomous vehicles in communication with the oversight system.

Clause 13. The method of clause 12, wherein the minimum risk condition maneuver command is received in response to the oversight system determining that each of the one or more autonomous vehicles meets a set of predetermined threshold conditions for the minimal risk condition maneuver.

Clause 14. The method of clause 11, further comprising receiving, from the oversight system, wind velocity information, the wind velocity information being sent by the oversight system to one or more autonomous vehicles in communication with the oversight system.

Clause 15. The method of clause 10, further comprising, selecting a mounting point for one or anemometers on the autonomous vehicle as part of the wind gust detection subsystem.

Clause 16. The method of clause 15, wherein selecting a mounting point for one or more anemometers comprises any of:
the use of experimentally obtained data; and
the use of computer modeling.

Clause 17. The method of clause 10, wherein modifying the trajectory or route of the autonomous vehicle to comply with a course of action determined by the wind gust compensation module comprises:
receiving, by an autonomous control unit, the course of action from the wind gust compensation module; and
signaling, by the autonomous control unit, changes to any of:
a steering subsystem;
a braking subsystem; and
an engine power output subsystem.

Clause 18. The method of clause 17, wherein the course of action determined by the wind gust compensation module comprises a minimal risk condition maneuver.

Clause 19. An apparatus comprising:
at least one processor; and
at least one memory including instructions which, when executed by the at least one processor, cause the at least one processor to perform operations comprising:
detecting, by a wind gust detection subsystem of an autonomous vehicle, a presence of a wind gust;
determining, by a wind gust detection module of the autonomous vehicle, characteristics of the wind gust;
determining, by a wind gust compensation module of the autonomous vehicle, that a change of trajectory or route for the autonomous vehicle is required to safely operate the autonomous vehicle;
determining, by the wind gust compensation module, a course of action; and
modifying a trajectory or route of the autonomous vehicle to comply with the course of action determined by the wind gust compensation module.

Clause 20. The apparatus of clause 19 further comprising:
a network communications unit; and
wherein the operations further comprise:
sending, by a network communications module of the autonomous vehicle, wind velocity information to an oversight system.

What is claimed is:

1. A system, comprising:
an autonomous vehicle comprising:
a wind gust detection subsystem, wherein:
the wind gust detection subsystem comprises a first wind sensor and a second wind sensor positioned side by side across a width direction of the autonomous vehicle, the first wind sensor being mounted toward a midline of the autonomous vehicle on a sensor support bar, and the second wind sensor being mounted in an area above a passenger seat, wherein the first wind sensor and the second wind sensor are configured to acquire data at a variable rate to suit a computational and operational need of the autonomous vehicle; and
the sensor support bar comprises a damping component configured to isolate the sensor support bar from at least a portion of vibration associated with the autonomous vehicle;
an in-vehicle control computer comprising:
a wind gust detection module, the wind gust detection module configured to receive the acquired data from the wind gust detection subsystem and to generate a determination of a wind gust and wind gust characteristics; and
a wind gust compensation module, the wind gust compensation module configured to accept the determination of the wind gust and the wind gust characteristics from the wind gust detection module; and
an autonomous control subsystem.

2. The system of claim 1 wherein the first wind sensor is mounted or located on an external portion of the autonomous vehicle.

3. The system of claim 1, wherein the first wind sensor comprises any of the following:
a mechanical anemometer comprising rotating cups and a wind vane;
a pitot tube anemometer; or
an ultrasonic anemometer.

4. The system of claim 1, wherein the second wind sensor is mounted on a sensor housing.

5. The system of claim 1, wherein the first wind sensor is mounted or located in a location comprising any of:
- over a cab portion of the autonomous vehicle; or
- on a roof portion of the autonomous vehicle.

6. The system of claim 1, further comprising an oversight system in communication with the autonomous vehicle, the oversight system configured to receive wind velocity information from any of:
- the wind gust detection module;
- at least one of the first wind sensor or the second wind sensor of the wind gust detection subsystem; or
- the wind gust compensation module.

7. The system of claim 6, wherein the oversight system is further configured to send a minimal risk condition maneuver command to the autonomous vehicle when the oversight system determines that the autonomous vehicle is experiencing wind velocities that meet a predetermined threshold.

8. The system of claim 7, wherein the oversight system is further configured to relay wind gust information to one or more additional autonomous vehicles which may be impacted by wind velocities experienced by the autonomous vehicle that sent the wind velocity information.

9. The system of claim 1, wherein the damping component comprises a spring, a patterned or textured material, or a hydraulic component.

10. A method, comprising:
- detecting, by a wind gust detection subsystem of an autonomous vehicle, a presence of a wind gust, wherein:
  - the wind gust detection subsystem comprises a first wind sensor and a second wind sensor positioned side by side across a width direction of the autonomous vehicle, the first wind sensor being mounted toward a midline of the autonomous vehicle on a sensor support bar, and the second wind sensor being mounted in an area above a passenger seat, wherein the first wind sensor and the second wind sensor are configured to acquire data at a variable rate to suit a computational and operational need of the autonomous vehicle; and
  - the sensor support bar comprises a damping component configured to isolate the sensor support bar from at least a portion of vibration associated with the autonomous vehicle;
- determining, based on the acquired data and by a wind gust detection module of the autonomous vehicle, characteristics of the wind gust;
- determining, based on the characteristic of the wind gust and by a wind gust compensation module of the autonomous vehicle, that a change of trajectory or route for the autonomous vehicle is required to safely operate the autonomous vehicle;
- determining, by the wind gust compensation module, a course of action; and
- modifying a trajectory or route of the autonomous vehicle to comply with a course of action determined by the wind gust compensation module.

11. The method of claim 10, further comprising sending, by a network communications module of the autonomous vehicle, wind velocity information to an oversight system.

12. The method of claim 11, further comprising receiving, from the oversight system, a minimal risk condition maneuver command, the minimal risk condition maneuver command being issued by the oversight system to one or more autonomous vehicles in communication with the oversight system.

13. The method of claim 12, wherein the minimal risk condition maneuver command is received in response to the oversight system determining that each of the one or more autonomous vehicles meets a set of predetermined threshold conditions for a minimal risk condition maneuver.

14. The method of claim 11, further comprising receiving, from the oversight system, wind velocity information, the wind velocity information being sent by the oversight system to one or more autonomous vehicles in communication with the oversight system.

15. The method of claim 10, further comprising, selecting a mounting point for the first wind sensor or the second wind sensor on the autonomous vehicle as part of the wind gust detection subsystem.

16. The method of claim 15, wherein selecting a mounting point for the first wind sensor or the second wind sensor comprises any of:
- use of experimentally obtained data; or
- use of computer modeling.

17. The method of claim 10, wherein modifying the trajectory or route of the autonomous vehicle to comply with a course of action determined by the wind gust compensation module comprises:
- receiving, by an autonomous control unit, the course of action from the wind gust compensation module; and
- signaling, by the autonomous control unit, changes to any of:
  - a steering subsystem;
  - a braking subsystem; or
  - an engine power output subsystem.

18. The method of claim 17, wherein the course of action determined by the wind gust compensation module comprises a minimal risk condition maneuver.

19. An apparatus comprising:
- at least one processor; and
- at least one memory including instructions which, when executed by the at least one processor, cause the at least one processor to perform operations comprising:
  - detecting, by a wind gust detection subsystem of an autonomous vehicle, a presence of a wind gust, wherein:
    - the wind gust detection subsystem comprises a first wind sensor and a second wind sensor positioned side by side across a width direction of the autonomous vehicle, the first wind sensor being mounted toward a midline of the autonomous vehicle on a sensor support bar, and the second wind sensor being mounted in an area above a passenger seat, wherein the first wind sensor and the second wind sensor are configured to acquire data at a variable rate to suit a computational and operational need of the autonomous vehicle; and
    - the sensor support bar comprises a damping component configured to isolate the sensor support bar from at least a portion of vibration associated with the autonomous vehicle;
  - determining, based on the acquired data and by a wind gust detection module of the autonomous vehicle, characteristics of the wind gust;
  - determining, based on the characteristic of the wind gust and by a wind gust compensation module of the autonomous vehicle, that a change of trajectory or route for the autonomous vehicle is required to safely operate the autonomous vehicle;
  - determining, by the wind gust compensation module, a course of action; and modifying a trajectory or route of the autonomous vehicle to comply with the course of action determined by the wind gust compensation module.

20. The apparatus of claim 19 further comprising:
a network communications unit; and
wherein the operations further comprise:
- sending, by a network communications module of the autonomous vehicle, wind velocity information to an oversight system.

* * * * *